Figure 1:
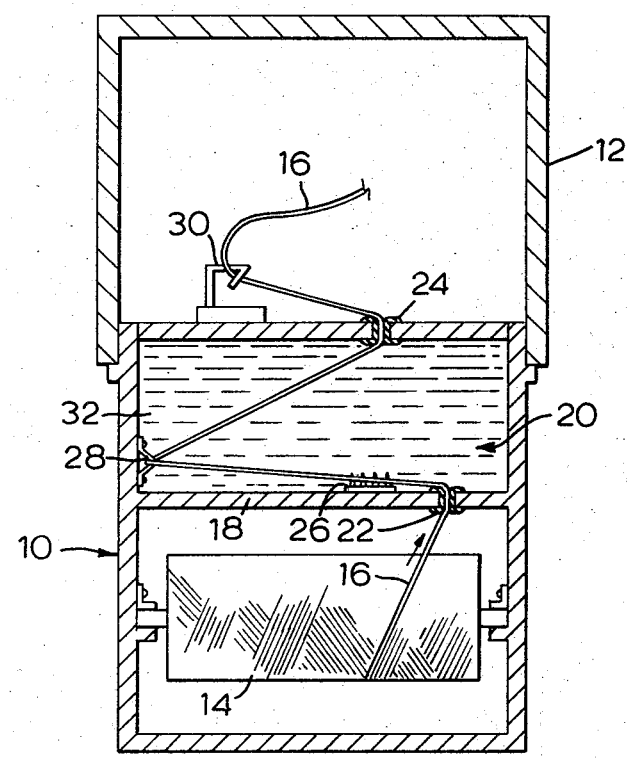

United States Patent [19]
Kaphalakos

[11] 3,830,247
[45] Aug. 20, 1974

[54] ANTISEPTIC DENTAL FLOSS

[76] Inventor: Peter Kaphalakos, 106 Carsbrooke, Etobicoke, Ontario, Canada

[22] Filed: May 25, 1973

[21] Appl. No.: 364,111

[30] Foreign Application Priority Data
July 31, 1972   Great Britain .................... 35677/72

[52] U.S. Cl. ............................................. 132/90
[51] Int. Cl. ............................................ A61c 15/00
[58] Field of Search ............ 132/90, 91, 92 R, 92 A; 128/335.5; 424/93

[56] References Cited
UNITED STATES PATENTS

| | | | |
|---|---|---|---|
| 719,017 | 1/1903 | Lenhardtson ......................... | 132/90 |
| 1,966,463 | 7/1934 | Rose .................................. | 132/92 R |
| 1,971,570 | 8/1934 | Lukens .............................. | 128/335.5 |
| 2,128,701 | 8/1938 | Gelinsky ........................... | 128/335.5 |
| 2,700,636 | 1/1955 | Ashton............................... | 424/93 |
| 3,491,776 | 1/1970 | Fleming ............................ | 132/89 |
| 3,667,483 | 6/1972 | McCabe............................. | 132/92 A |

*Primary Examiner*—G. E. McNeil

[57] ABSTRACT

Dental floss impregnated with antiseptic material. A dispenser for such dental floss comprises a housing with a freely rotatable spool and a liquid impervious chamber with self-sealing ingress and egress ports for passage of dental floss through the chamber from the spool.

3 Claims, 1 Drawing Figure

PATENTED AUG 20 1974  3,830,247

ANTISEPTIC DENTAL FLOSS

This invention relates to dental floss and a dispenser for treating dental floss.

Dental floss is manufactured and sold in thread or string form and is used to clean particles of food lodged between the teeth. However, when such particles lodge between the teeth they immediately begin to break down and when they are dislodged they leave a residue of material which promotes tooth decay.

It is an object of the present invention to provide an improved dental floss and a method and device for dispensing such improved dental floss.

An example embodiment of the device of the invention is shown in the accompanying drawing, in which FIG. 1 is a view in vertical cross-section.

The example embodiment comprises a housing 10 having a removable cover 12. A spool 14 is mounted for free rotation in the bottom portion of housing 10 for carrying dental floss 16 wound on the spool. Above spool 14, housing 10 carries a container 18 defining a liquid impervious chamber 20. A self-sealing opening or port 24 is located in the wall of container 18 remote from port 22. The wall of chamber 20 carries a fixed comb 26 adjacent port 22 and a fixed loop 28 remote from both ports 22 and 24. A cutter loop 30 is fixed on the outside of container 18 adjacent port 24.

In the operation of the device a length of dental floss 16 is wound on spool 12 and the free end portion of the floss passes into chamber 20 through port 22, over comb 26, through loop 28, out of chamber 20 through port 24, and through cutter 30 where it is suitably secured. Chamber 20 is filled with liquid antiseptic 32. In use, cover 12 is removed from housing 10 and the free end of floss 16 is freed from cutter 30 and pulled. This action draws a length of floss 16 from spool 16 through liquid antiseptic 32, passing over comb 26 which spreads the floss for better impregnation of the liquid into the floss. The length of floss 16 drawn through chamber 20 is then severed by cutter 30 and used for cleaning the teeth. By passing floss 16 through loop 28 a greater length of the floss is located at one time in chamber 20 for better impregnation by liquid antiseptic 32.

Waxed dental floss is used in the invention to obtain impregnation by the antiseptic liquid which for example, may be hydrogen peroxide or a commercial brand of antiseptic such as Listerine (a trade mark). g,4

I claim:

1. A device for dispensing dental floss, comprising
a housing;
a spool mounted for free rotation in the housing;
a chamber within the housing for containing liquid antiseptic material;
self-sealing ingress and egress openings in the chamber for the passage of dental floss therethrough from the spool; and
means mounted in the chamber and positioned whereby the dental floss passes thereover and is spread thereby.

2. A device as claimed in claim 1 including cutting means mounted on the housing adjacent the egress opening.

3. A device as claimed in claim 1 including guide means within the chamber constructed and arranged to pass the dental floss in an extended path therethrough.

* * * * *

UNITED STATES PATENT OFFICE
CERTIFICATE OF CORRECTION

Patent No. 3,830,247          Dated August 20, 1974

Inventor(s) Peter Kaphalakos

It is certified that error appears in the above-identified patent and that said Letters Patent are hereby corrected as shown below:

On the title page, in item [76]

"106 Carsbrooke, Etobicoke, Ontario, Canada" should read

-- 104 Carsbrooke Road, Etobicoke 650, Ontario, Canada --.

Signed and sealed this 19th day of November 1974.

(SEAL)
Attest:

McCOY M. GIBSON JR.
Attesting Officer

C. MARSHALL DANN
Commissioner of Patents